United States Patent
Klampfer et al.

(10) Patent No.: US 12,049,843 B2
(45) Date of Patent: Jul. 30, 2024

(54) CYLINDER HEAD

(71) Applicant: AVL LIST GMBH, Graz (AT)

(72) Inventors: Martin Klampfer, Hitzendorf (AT); Andreas Zurk, Weinburg (AT)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 17/910,795

(22) PCT Filed: Mar. 16, 2021

(86) PCT No.: PCT/AT2021/060090
§ 371 (c)(1),
(2) Date: Sep. 9, 2022

(87) PCT Pub. No.: WO2021/184053
PCT Pub. Date: Sep. 23, 2021

(65) Prior Publication Data
US 2023/0112789 A1 Apr. 13, 2023

(30) Foreign Application Priority Data

Mar. 16, 2020 (AT) .............................. A 50222/2020

(51) Int. Cl.
*F02B 19/12* (2006.01)
*F02B 19/16* (2006.01)

(52) U.S. Cl.
CPC .............. *F02B 19/12* (2013.01); *F02B 19/16* (2013.01)

(58) Field of Classification Search
CPC ...... F02B 19/12; F02B 19/16; F02B 19/1014; F02B 19/108; F02B 19/1004; F02M 21/0218; F02M 21/0281; F02F 1/242
See application file for complete search history.

(56) References Cited

U.S. PATENT DOCUMENTS

| 4,414,940 | A | 11/1983 | Loyd | |
|---|---|---|---|---|
| 10,947,948 | B1 * | 3/2021 | Glugla | F02P 15/02 |

(Continued)

FOREIGN PATENT DOCUMENTS

| AT | 509876 A4 | 12/2011 |
|---|---|---|
| AT | 516619 A4 | 7/2016 |

(Continued)

*Primary Examiner* — Xiao En Mo
(74) *Attorney, Agent, or Firm* — Dykema Gossett PLLC

(57) ABSTRACT

The invention relates to a cylinder head (1) with at least one recess (23) for arranging at least one gas valve (20) and at least one spark plug (15). The spark plug (15) reaches into a pre-chamber (17) and is arranged along a spark plug rotational axis (16), and the gas valve (20) is arranged along a gas valve rotational axis (19), wherein the gas valve rotational axis (19) is inclined relative to the spark plug rotational axis (16), and the distance (A) between the gas valve rotational axis (19) and the spark plug rotational axis (16) decreases as the distance to the pre-chamber (17) increases in a direction facing away from the combustion chamber (2). The aim of the invention is to provide an improved cylinder head (1) which allows an improved assembly and requires less installation space. According to the invention, this is achieved by the aforementioned cylinder head (1) in that the recess (23) for the spark plug (15) and the gas valve (20) has a surface (0) which is formed by a primary molding process, preferably a casting process, and is post-processed particularly preferably without machining.

13 Claims, 3 Drawing Sheets

(56) References Cited

U.S. PATENT DOCUMENTS

| | | | |
|---|---|---|---|
| 11,156,147 B1* | 10/2021 | Yu | F02B 19/12 |
| 2002/0104507 A1* | 8/2002 | Riggs | F02B 19/12 |
| | | | 123/266 |
| 2011/0108012 A1 | 5/2011 | Bryant et al. | |
| 2018/0258835 A1* | 9/2018 | Anderson | F02B 19/10 |
| 2020/0362750 A1* | 11/2020 | Rabhi | F02B 19/18 |

FOREIGN PATENT DOCUMENTS

| | | |
|---|---|---|
| CN | 109098834 A | 12/2018 |
| WO | 2017082953 A1 | 5/2017 |

\* cited by examiner

CYLINDER HEAD

CROSS-REFERENCE TO RELATED APPLICATION

This application is a national stage filing based upon International application No. PCT/AT2021/060090, filed 16 Mar. 2021, which claims the benefit of priority to Austria application No. A 50222/2020, filed 16 Mar. 2020.

BRIEF SUMMARY

The invention relates to a cylinder head having at least one recess for arranging at least one gas valve and at least one spark plug, wherein the spark plug extends into a pre-chamber, the spark plug is arranged along a spark plug rotational axis, and the gas valve is arranged along a gas valve rotational axis, wherein the gas valve rotational axis is inclined relative to the spark plug rotational axis, and a distance between the gas valve rotational axis and the spark plug rotational axis decreases with a distance from the pre-chamber in a direction away from the combustion chamber.

BACKGROUND

This cylinder head is provided for an internal combustion engine with gasoline engine combustion with combustion of a gaseous fuel. Natural gas, for example, can be used as the fuel. The combustion of any other gaseous fuel is also possible. Such a cylinder head is known, for example, from CN 109098834 A. This has a gas valve on one side of the cylinder axis and the spark plug is arranged opposite the gas valve on the other side of a plane spanned by the cylinder axis. The gas valve is aligned parallel to the cylinder axis. For this purpose, the spark plug is inclined slightly outward away from the pre-chamber. The required installation space increases sharply away from the pre-chamber. The gas exchange valves, whose guides are generally located around this arrangement, have to move further out and therefore have a greater distance between the valve axes and the cylinder axis.

A similar arrangement is shown in AT 516619 A4. In this case, the rotational axes of the gas valve and spark plug are designed in parallel, in contrast to CN 109098834 A shown above. In one of the two embodiments shown, the two machining surfaces overlap and lead into a common cavity. In the second embodiment shown, the machining surfaces are spaced apart from each other, greatly increasing the amount of installation space required.

Arrangements with interlocking, overlapping machining surfaces can save installation space, but this reduces the quality of the resulting surfaces for fitting the other components. This increases the number of rejects during production, which leads to higher production costs with reduced installation space.

The object of the present invention is to provide an improved cylinder head which permits faster finishing.

SUMMARY OF THE INVENTION

The above-mentioned cylinder head solves the object according to the invention in that the recess for the spark plug and gas valve has a surface which is formed by a primary shaping process, preferably a casting process, and is post-processed particularly preferably without machining.

As a result, most of the cavity for accommodating the spark plug in the cylinder head is formed by a primary shaping process. Subsequent machining is thus faster and easier.

In this case, the machining surfaces do not overlap and the quality of the resulting surfaces increases and the manufacturing effort decreases. The inclined arrangement, in which the distance from the combustion chamber decreases, saves installation space. The gas exchange valve guide can be arranged directly around the spark plug.

In the present invention, the recess is mostly cast and only the part for inserting the spark plug and gas valve, a gas valve receiving surface and a spark plug receiving surface are machined. The two machining surfaces do not overlap. The design according to the invention has the advantage that installation space can be saved.

This effect can be exploited particularly well if an angle of inclination between the gas valve rotational axis and the spark plug rotational axis is between 0.5° and 5°, preferably 1.5°.

A particularly favorable position for the spark plug in relation to the gaseous fuel introduced by the gas valve is achieved if the spark plug rotational axis is arranged concentrically to a cylinder rotational axis of a cylinder bore. This allows combustion to start as uniformly as possible from the centrally arranged spark plug. The ignition quality can thus be positively influenced to a significant extent.

This effect can be further enhanced if the pre-chamber rotational axis is concentric with the cylinder rotational axis of the cylinder bore.

In addition, this concentric arrangement of the components is favorable for the required installation space. The expansion of the individual components transverse to a cylinder rotational axis can thus be reduced.

To make production even more efficient, it is favorable if the cylinder head has at least one receiving sleeve for the gas valve and spark plug, in which the recess is formed.

This common recess for the gas valve and spark plug is formed in a separate component by casting. The separate component is referred to as the receiving sleeve. Advantageously, the recess is not reworked in any way. This saves production steps, costs and time.

In order to achieve a perfect tight fit of the spark plug, it is advantageously provided that starting from the recess, a spark plug receiving surface is formed by a mechanically machined surface, preferably by a bore.

This can also be favorably achieved for the gas valve if, starting from the recess, a gas valve receiving surface is formed by a mechanically machined surface, preferably formed by a bore.

To guarantee the quality of the receiving surfaces, simplify manufacturing and minimize scrap, it is favorable if the spark plug receiving surface and gas valve receiving surface are mechanically machined surfaces that are spaced apart and do not intersect.

Furthermore, it is favorable if machining surfaces for obtaining the gas valve receiving surface and spark plug receiving surface do not penetrate in the recess so that machining surfaces do not have any overlaps. This can reduce the entry of chips into the respective other receiving recess during machining.

It is favorable if gas exchange valves are provided for the charge exchange into the combustion chamber, with each gas exchange valve being assigned a valve spring. This allows the advantage of this arrangement in terms of saving installation space to be exploited perfectly.

This effect is particularly noticeable for an embodiment when the receiving sleeve extends in the direction of a cylinder rotational axis to a height and/or extends above this height where the valve springs are located, with the gas exchange valves being in the closed position.

The saving in installation space compared with a conventional cylinder head can be further increased if a distance between the receiving sleeve and gas exchange valves in a plane normal to the cylinder rotational axis is small, wherein a ratio between diameter and distance is between 1.5 and 3.5.

BRIEF DESCRIPTION OF THE DRAWINGS

The invention is further explained with reference to the non-limiting figures, wherein.

DETAILED DESCRIPTION

Figure 1:
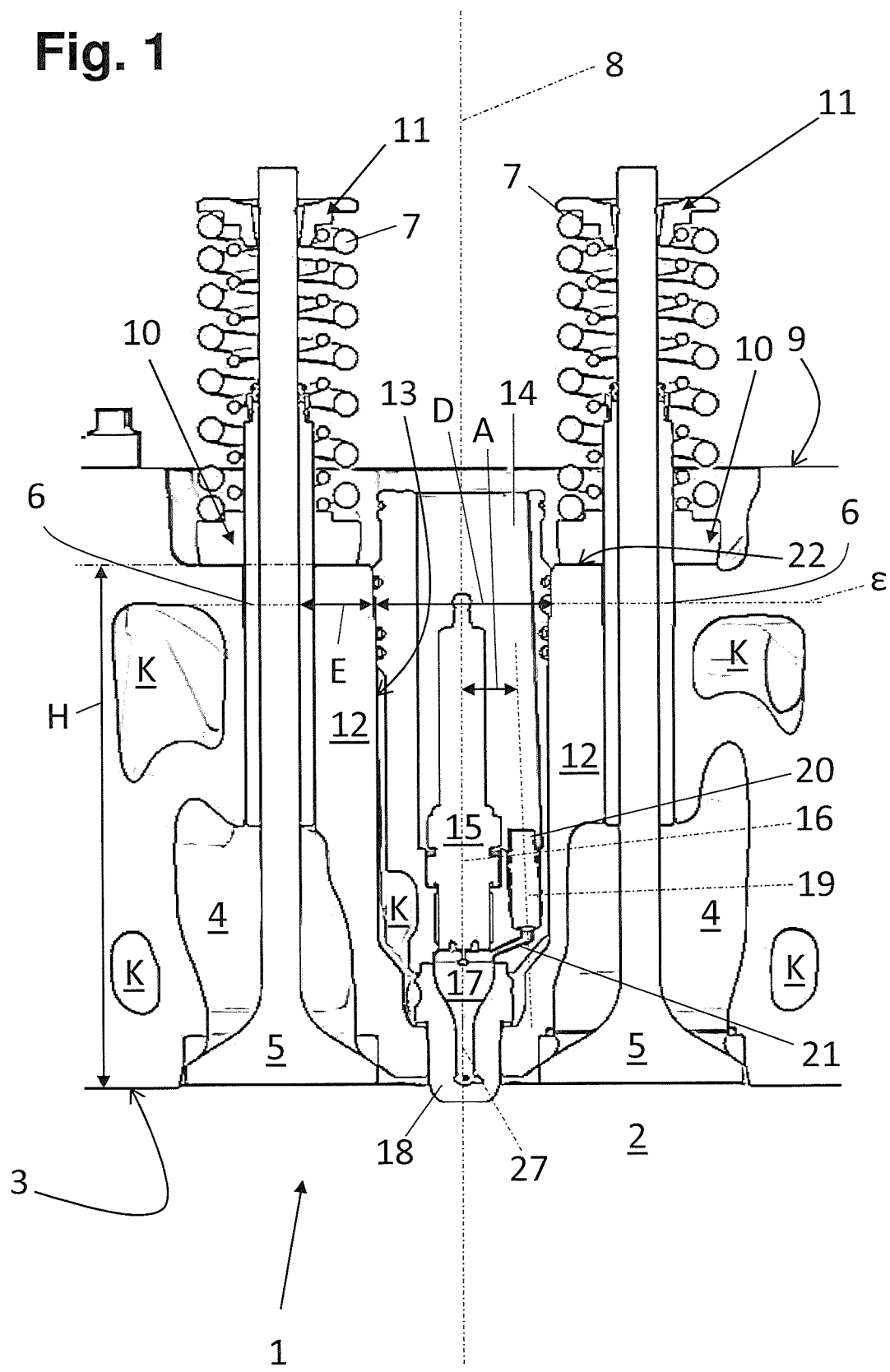
FIG. 1 shows a cylinder head according to the invention in section.

FIG. 1 shows a cylinder head 1 according to the invention in section. Here, a surface to a combustion chamber 2 of a cylinder not shown in more detail is referred to as a fire deck 3. Gas exchange channels 4 extend into the combustion chamber 2 and can be closed by gas exchange valves 5. For this purpose, the gas exchange valves 5 are each displaceable in a guide 6 and against the force of a valve spring 7.

In this sectional view, two gas exchange valves 5 are visible, which are arranged on either side of a cylinder rotational axis 8 and are designed as poppet valves. In the embodiment shown, the valve springs 7 are supported away from the combustion chamber 2 in the direction of the cylinder rotational axis 8 on a cover surface 9 of the cylinder head 1 by a first end 10. A second end 11, which is arranged facing away from the combustion chamber 2 around the gas exchange valve 5, is supported against the gas exchange valve 5.

From the cylinder rotational axis 8 radially inside the two gas exchange valves 5, the cylinder head 1 has a wall 12 with an opening 13, wherein the opening 13 penetrates the cylinder head 1 along the cylinder rotational axis 8. A receiving sleeve 14 is arranged within this opening 13. Within the receiving sleeve 14, a spark plug 15 is arranged along a spark plug rotational axis 16. In the direction of the combustion chamber 2, a pre-chamber 17 is provided adjacent to the spark plug 15, which is at least partially enclosed by a pre-chamber sleeve 18. The pre-chamber 17 is connected to the combustion chamber 2 via overflow openings not shown in greater detail. The pre-chamber 17 has a pre-chamber rotational axis 27 along which it is arranged.

In the embodiment shown, the pre-chamber 17 with its pre-chamber rotational axis 27 and the spark plug 15 with its spark plug rotational axis 16 are aligned concentrically with a cylinder bore with the cylinder rotational axis 8, which is not shown in more detail.

In alternative embodiments, this opening 13 is located offset from the cylinder rotational axis 8. In addition, the pre-chamber rotational axis 27 and the spark plug rotational axis 16 can be spaced independently of each other from the cylinder rotational axis 8.

An outer diameter D of the receiving sleeve 14 reaches very close to the valve springs 7. A distance E between the receiving sleeve 14 and the gas exchange valve 5 corresponds to about 0.4 times the outer diameter D. The relationship between diameter D and distance E is expressed here with the ratio D/E and is about 2.4. In conventional embodiments, a ratio D/E can be between 1.5 and 3.5.

The distance E is given here in a plane ε which is transverse to the cylinder rotational axis 8 and therefore forms the normal axis to the cylinder rotational axis 8.

A point of intersection of the gas valve rotational axis 19 and the spark plug rotational axis 16 is arranged outside the receiving sleeve 14, facing away from the combustion chamber 2 in the direction of the cover surface 9.

Cooling chambers and cooling channels are arranged around the receiving sleeve 14 and the pre-chamber shell 18, which are designated by reference signs K. Cooling chambers K are also provided around the gas exchange channels 4 for cooling the cylinder head 1. Seals are provided to protect the individual operating fluids from each other.

A gas valve 20 is aligned along a gas valve rotational axis 19. This gas valve 20 extends into a gas channel 21, which in turn fluidically connects the gas valve 20 to the pre-chamber 17.

The receiving sleeve 14 extends to a height H, from the fire deck 3. At this height, the first end 10 of the valve spring 7 rests on a bearing surface 22. In the embodiment shown, the receiving sleeve 14 extends in the opening 13 almost to the cover surface 9.

Figure 2:
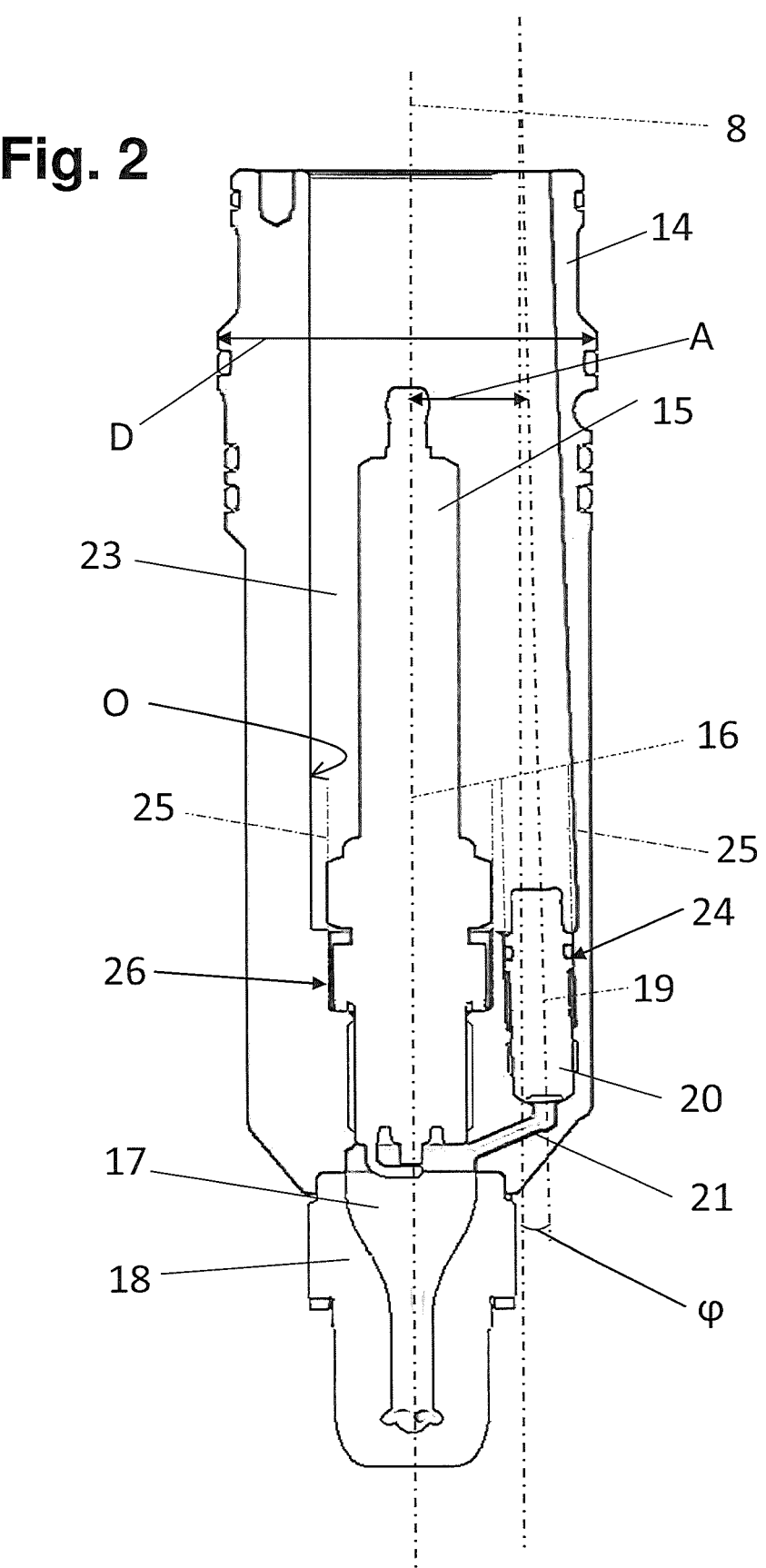
FIG. 2 shows a receiving sleeve and a pre-chamber sleeve of the cylinder head according to the invention in detail in section analogous to FIG. 1.

The receiving sleeve 14 and the elements within the receiving sleeve 14, as well as the pre-chamber shell 18, are shown enlarged in FIG. 2. It can be clearly seen here that the gas valve rotational axis 19 is inclined to the spark plug rotational axis 16. The angle of inclination φ is approx. 1.5° in the embodiment shown. In alternative embodiments, the angle of inclination φ is between 0.5° and 5°. In this case, the gas valve 20 is inclined towards the spark plug 15 in the direction of the cover surface 9 of the cylinder head 1.

Here, the spark plug 15 is arranged concentrically to the cylinder bore with the cylinder rotational axis 8 and the pre-chamber 17.

The gas valve 20 is particularly small and has a very small distance A to the spark plug 15. Due to the inclination with the angle of inclination φ, the installation space is further reduced. As a result, the distance A to the cover surface 9 of the cylinder head 1 decreases further and further.

The receiving sleeve 14 has a recess 23 in its interior. This recess 23 is formed for gas valve 20 and spark plug 15 together by casting the receiving sleeve 14. A surface O of the recess 23 is not machined.

The gas valve 20 and the spark plug 15 both extend into the recess 23 from a combustion chamber 2.

A gas valve receiving surface 24 is provided for accommodating and securing the gas valve 20 in the receiving sleeve 14. The gas valve receiving surface 24 is formed by machining along a machining surface 25 for the gas valve 20.

Similarly, a spark plug receiving surface 26 is located in the receiving sleeve 14 for accommodating and securing the spark plug 15. This spark plug receiving surface 26 is in turn formed by machining along a second machining surface 25 for the spark plug 15.

This gas valve receiving surface 24 and the spark plug receiving surface 26 are cylindrical, for example.

In the embodiment shown, the spark plug 15 and the gas valve 20 are each disposed in bores.

Preferably, the pre-chamber sleeve 18 is connected to the receiving sleeve 14 by a connection not shown in detail.

Figure 3:
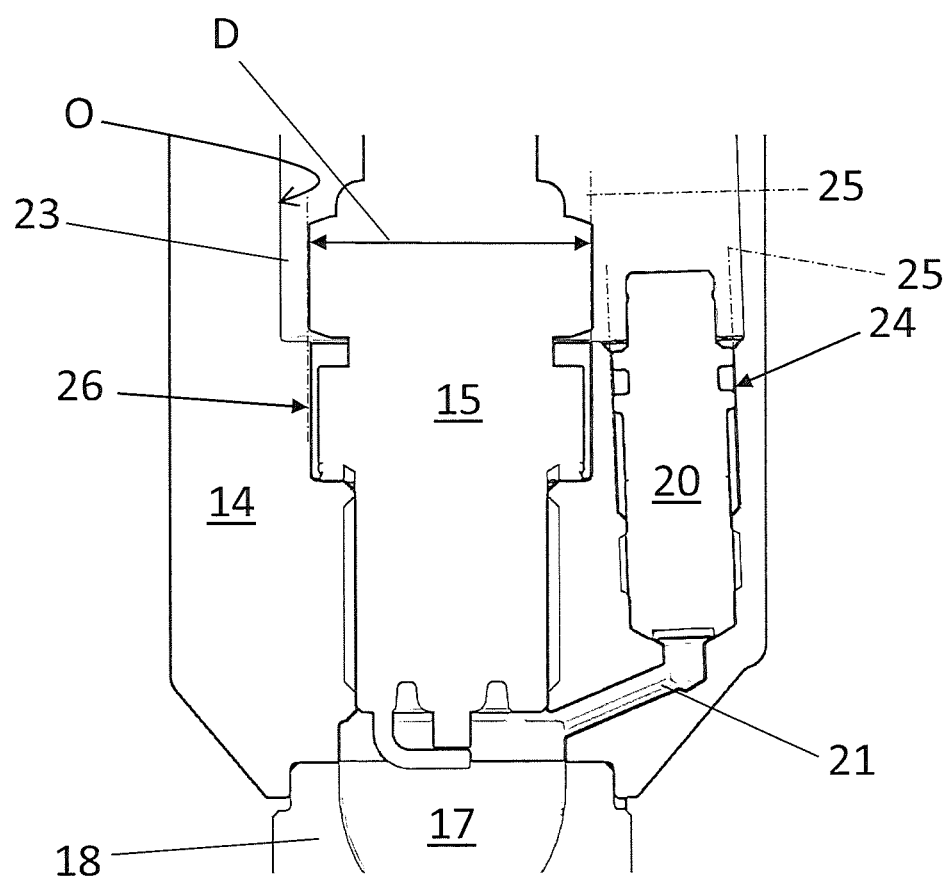
FIG. 3 shows another detail of the receiving sleeve and pre-chamber sleeve of FIG. 2.

The machining surfaces 25 for the gas valve 20 and for the spark plug 15 are indicated with dashed lines in FIG. 2 and FIG. 3.

The machining surfaces 25 do not overlap within the receiving sleeve 14 and are always spaced apart within the receiving sleeve 14.

FIG. 3 shows another enlarged detail of the receiving sleeve 14 and the pre-chamber sleeve 18 of FIG. 2.

The invention claimed is:

1. Cylinder head comprising:
    at least one gas valve arranged along a gas valve rotational axis;
    a pre-chamber;
    at least one spark plug extending into the pre-chamber and arranged along a spark plug rotational axis; and
    at least one recess for arranging the at least one gas valve and the at least one spark plug;
    at least one receiving sleeve for the at least one gas valve and the spark plug, in which the at least one recess is formed,
    wherein the gas valve rotational axis is inclined relative to the spark plug rotational axis, and a distance between the gas valve rotational axis and the spark plug rotational axis decreases with a distance from the pre-chamber in a direction facing away from the combustion chamber;
    characterized in that the at least one recess to the spark plug and gas valve has a surface which is formed by a primary shaping process that includes casting, and is post-processed without machining, wherein a point of intersection of the gas valve rotational axis and the spark plug rotational axis is arranged outside the receiving sleeve, facing away from the combustion chamber in the direction of a cover surface of the cylinder head.

2. The cylinder head according to claim 1, wherein an angle of inclination between the gas valve rotational axis and the spark plug rotational axis is between 0.5° and 5°.

3. The cylinder head according to claim 1, wherein the spark plug rotational axis is arranged concentrically to a cylinder rotational axis of a cylinder bore.

4. The cylinder head according to claim 1, wherein a pre-chamber rotational axis is arranged concentrically to a cylinder rotational axis of a cylinder bore.

5. The cylinder head according to claim 1, wherein, starting from the recess, a spark plug receiving surface is formed by a mechanically machined surface.

6. The cylinder head according to claim 1, wherein starting from the recess, a gas valve receiving surface is formed by a bore.

7. The cylinder head according to claim 5, wherein the spark plug receiving surface and a gas valve receiving surface are mechanically machined surfaces that are spaced apart and do not intersect.

8. The cylinder head according to claim 7, wherein machining surfaces for obtaining the gas valve receiving surface and the spark plug receiving surface in the recess do not penetrate, so that the machining surfaces do not overlap.

9. The cylinder head according to claim 5, further including gas exchange valves configured and arranged for the exchange of charge into the combustion chamber, wherein each gas exchange valve is assigned a valve spring.

10. The cylinder head according to claim 9, wherein the at least one receiving sleeve extends in the direction of a cylinder rotational axis to a height and/or extends above the height in which the valve springs are arranged, wherein the gas exchange valves are in the closed position.

11. The cylinder head according to claim 9, wherein a ratio between an outer diameter of the at least one receiving sleeve and distance between the at least one receiving sleeve and gas exchange valves is between 1.5 and 3.5.

12. The cylinder head according to claim 1, wherein an angle of inclination between the gas valve rotational axis and the spark plug rotational axis is 1.5°.

13. The cylinder head according to claim 1, characterized in that, starting from the recess, a spark plug receiving surface is formed by a bore.

* * * * *